United States Patent Office 3,498,067
Patented Mar. 3, 1970

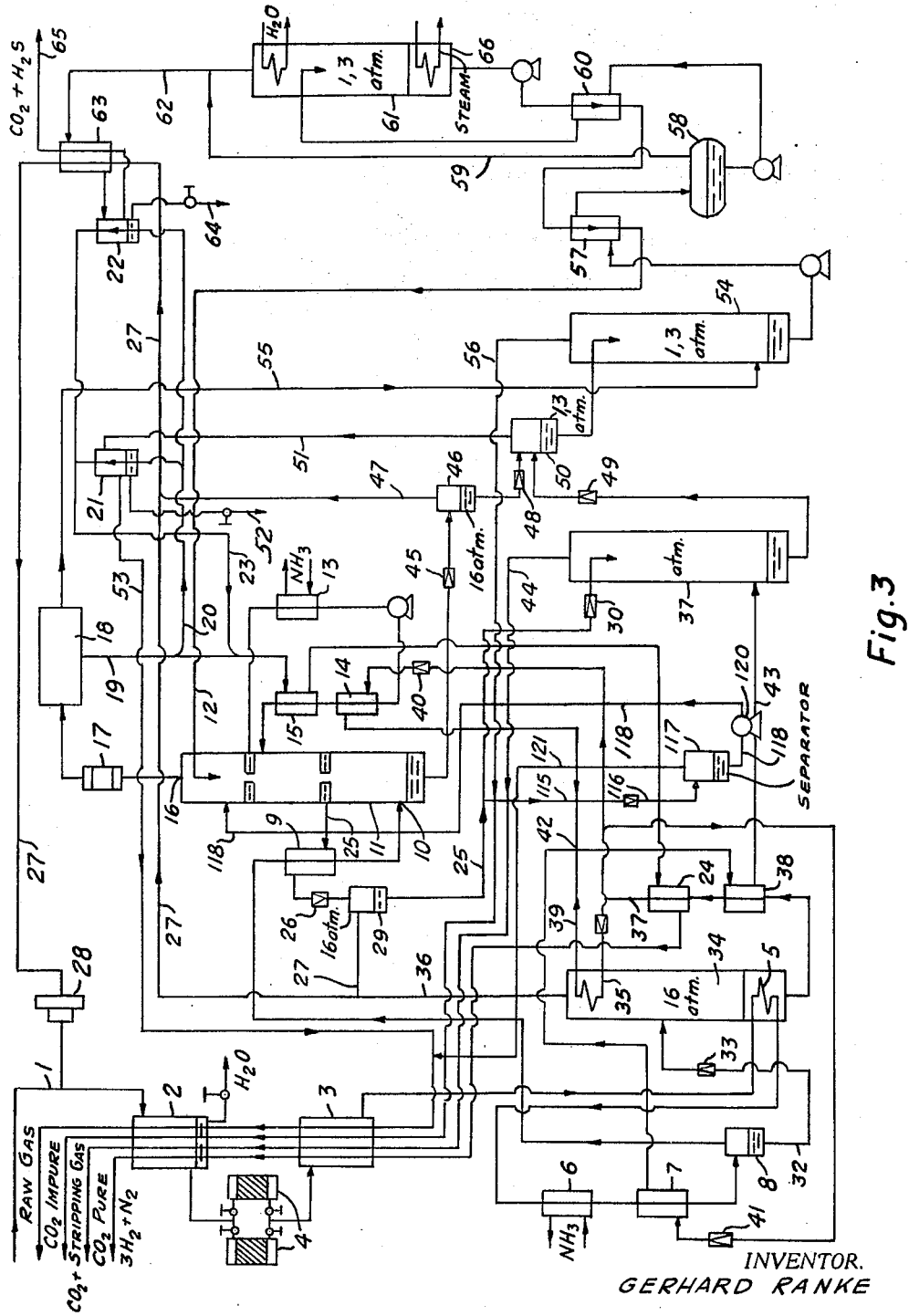

3,498,067
SYSTEMS FOR REMOVAL OF CO₂ FROM GASEOUS MIXTURES
Gerhard Ranke, Munich, Germany, assignor of fifty percent each to Linde Aktiengesellschaft, Wiesbaden, Germany and Metallgesellschaft A.G., Frankfurt, Germany
Filed Nov. 15, 1966, Ser. No. 594,456
Claims priority, application Germany, Nov. 15, 1965, L 52,150
Int. Cl. F25j *3/08, 3/06*
U.S. Cl. 62—17                                    13 Claims

ABSTRACT OF THE DISCLOSURE

A high pressure hydrogen-containing gas is treated to remove $H_2S$ $CO_2$ by condensing out a portion of $CO_2$ in the liquid phase by heat exchange with products that have been separated and by heat exchange with $CO_2$ evaporating under reduced pressure after it had been liquefied. The resultant uncondensed gaseous mixture is scrubbed with a scrubbing liquid, which is removed from the scrubbing column as a $CO_2$-loaded, $H_2S$-free scrubbing liquid at a point where the rising gaseous mixture contains substantially no $H_2S$. The removed scrubbing liquid is used to scrub $H_2S$ and $CO_2$ from a vaporized liquid $CO_2$ fraction which fraction was derived from the $CO_2$ evaporating under reduced pressure after it had been liquefied. The invention is set forth in process and apparatus claims.

---

This invention relates to a process and apparatus for the separation of $CO_2$ and $H_2S$ from a gaseous mixture and in particular to a system comprising the liquefaction of a portion of the $CO_2$ in the raw gas by heat exchange with (a) separation products and (b) with $CO_2$ evaporating under a reduced pressure after its liquefaction, this liquefaction step being followed by a low temperature scrubbing step for removing further the $CO_2$. In this connection, the raw gas must be under such a high pressure that a partial liquefaction of the $CO_2$ is attained at the temperatures obtainable by vaporizing condensed $CO_2$.

In the production of hydrogen-containing gaseous mixtures for syntheses which are intended for use in industrial plants, e.g., the ammonia, methanol, or Fischer-Tropsch synthesis, the so-called water-gas shift reaction is employed, i.e., the CO contained in the gaseous mixture is reacted, in the presence of catalysts, with steam, so that $CO_2$ and $H_2$ are produced, the resultant gas, for the purposes of this invention, being identified as converter gas. To remove the $CO_2$ from the thus-obtained converter gas, which gas is under a pressure of about 30–150 atmospheres absolute, it is conventional to eliminate part of the $CO_2$ by condensation at the low temperatures produced by the vaporization of already condensed $CO_2$, and to scrub out the residual $CO_2$ together with sulfur-containing impurities by means of a solvent which remains fluid under the ambient temperature and pressure conditions (reference: German Patent No. 908,013). During this process, a portion of the hydrogen sulfide contained in the raw gas condenses out together with the $CO_2$, and the remainder is removed during the subsequent solvent scrubbing step. Thus, the hydrogen sulfide shows up partially in the vaporized $CO_2$ fraction and partially in the $CO_2$ fraction escaping during the regeneration of the solvent. It is inherent in this type of operation that it is neither possible to directly obtain a sufficiently pure $CO_2$ fraction suitable, for example, for urea synthesis or for purposes of food chemistry, nor is it possible to evolve a residual gas which can be discharged into the atmosphere on the other hand. Moreover, none of the fractions has a sufficiently high hydrogen sulfide content to permit economic recovery thereof, as otherwise would be the case in, for example, a Claus plant.

It is, therefore, a principal object of this invention to separate $CO_2$ and $H_2O$ from gaseous mixtures, such as converter gas, blast furnace gas, or flue gas, so that a fraction of pure $CO_2$ can be obtained, aside from the relatively pure hydrogen-containing gaseous mixture which is normally obtained. This pure $CO_2$ fraction is suitable, for example, for urea synthesis or for use in food chemistry.

Upon further study of the specification and claims, other objects and advantages of the present invention will become apparent.

In the drawings:

FIGURE 3 is a schematic flowsheet illustrating another modification of the embodiment of FIGURE 1.

Figure 1:
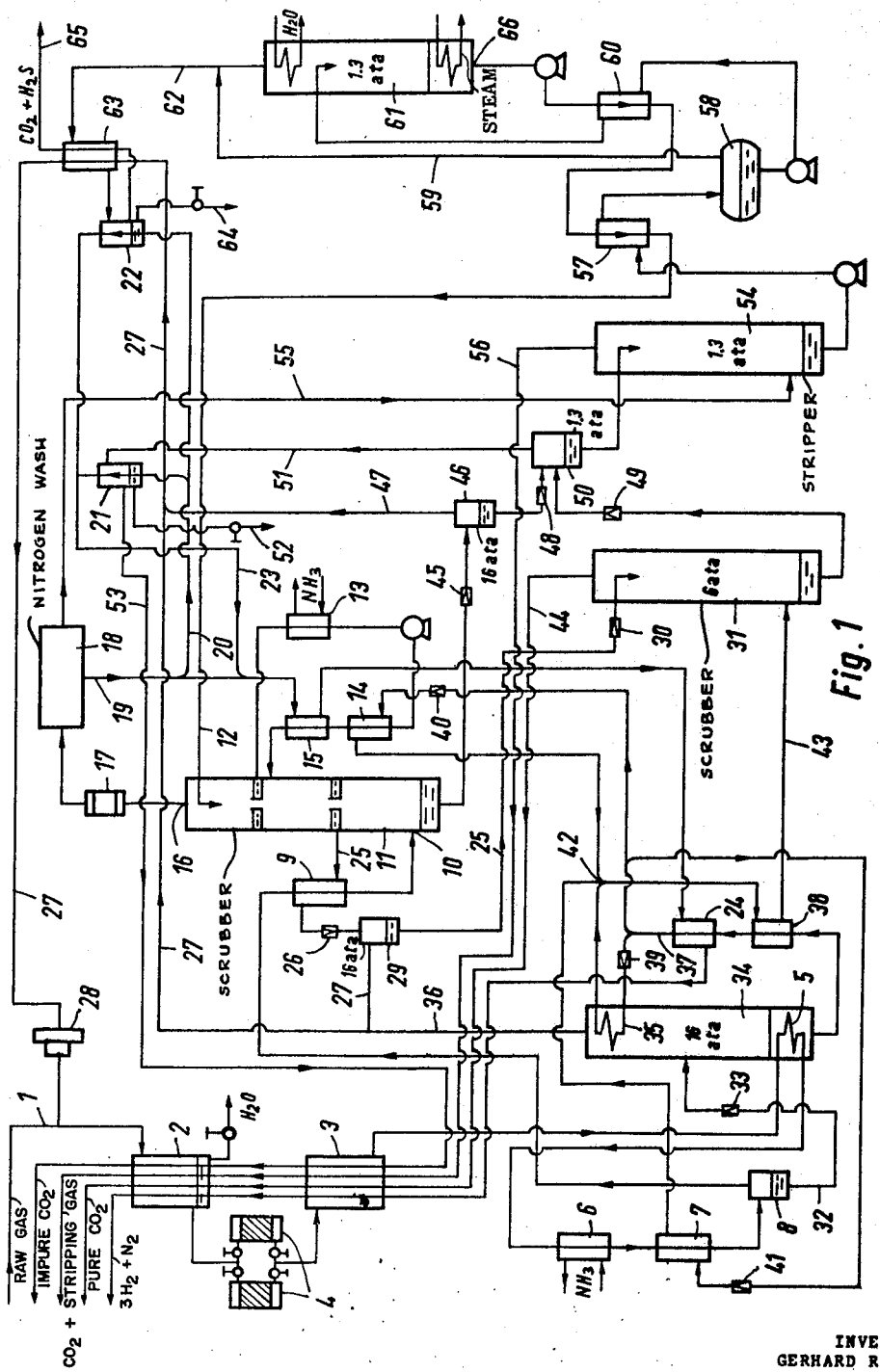
FIGURE 1 is a schematic flowsheet of a comprehensive preferred embodiment of this invention.

The principal object of this invention is obtained by withdrawing from the low temperature scrubbing stage scrubbing liquid loaded with $CO_2$ at a point where the rising gaseous mixture contains practically no $H_2S$. This $CO_2$-loaded scrubbing liquid, in turn, is employed to scrub out the $H_2S$ which was condensed together with the $CO_2$. The latter $H_2S$—$CO_2$ is the liquefied fraction which is vaporized before scrubbing out of the $H_2S$.

In the process of this invention, $H_2S$ is removed for the very first time by solvent scrubbing media from a gaseous mixture containing, in addition to this $H_2S$, practically exclusively $CO_2$. Since the selctivity of the normally used scrubbing media, such as methanol, with respect to $H_2S$ is somewhat higher as compared to $CO_2$ selectively, $H_2S$ is preferably absorbed when scrubbing $H_2S$ from $CO_2$ by means of a pure solvent. However, so much $CO_2$ simultaneously enters the solution that the thus-developed heat of solution would cause a prohibitive consumption of refrigration energy which would make the process uneconomical. For this reason, the scrubbing of $H_2S$ out of $CO_2$ has never been considered heretofore.

According to this invention, considering the fact that less scrubbing liquid is required for the $H_2S$ than for the removal of $CO_2$ because of better solubility of $H_2S$, scrubbing liquid is branched off at a certain location along the process stages of the raw gas purification system, namely, at that point where there is substantially no $H_2S$ contained in the rising gas, i.e., less than about $5 \times 10^{-4}$ volume percent, but where the descending scrubbing liquid is already loaded with $CO_2$. This branched-off scrubbing liquid is employed for scrubbing $H_2S$ out of the liquid $CO_2$ fraction after the vaporization thereof, so that this fraction can be worked up to pure $CO_2$ without any special additional energy requirements.

The above-described process is conducted in an apparatus comprising heat exchangers constructed for high pressure operation in order to cool the high pressure raw gaseous mixture. A phase separator is also required for the separation of liquid $CO_2$ from the gaseous mixture. A first scrubbing column is employed, the sump of the phase separator being connected by way of one expansion valve with a heat exchanger, and the head of the phase separator being connected with the first scrubbing column. The apparatus of this invention further comprises an additional scrubbing column, the foot of which is connected to the flow paths of heat exchangers which are also in communication via an expansion valve with the phase separator, and the head of which is in communication with the first scrubbing column via a scrubbing medium conduit branched off from the first scrubbing column at about the middle portion thereof.

In order to avoid the depositing of solid $CO_2$, the liquid $CO_2$ fraction must be vaporized at a pressure above the triple point pressure of $CO_2$, i.e., 5.28 atmospheres, and scrubbed. In this connection, it is advantageous to select the scrubbing pressure only a little higher than this pressure, at least about 6 atmospheres, preferably about 5.3 to 6.5 atmospheres, so that as low a vaporization temperature as possible is obtained. The pure $CO_2$ is thus obtained at a pressure of at least about 6 atmospheres, whereby compression energy is saved, if it is to be compressed, for example, for a synthesis stage connected thereafter. (In this invention, all pressures are absolute, unless otherwise indicated.)

In order to avoid losses of valuable components of the raw gas, particularly $H_2$, a modification is introduced, according to a further embodiment of the present invention, whereby (1) the liquid $CO_2$ fraction condensed out of the high pressure gaseous mixture, and (2) the $CO_2$-containing $H_2S$-free scrubbing liquid withdrawn from the low-temperature scrubbing of the high-pressure gaseous mixture, are expanded to the pressure at which the vaporized liquid $CO_2$ fraction is scrubbed. This expansion step is conducted in two stages; any gaseous mixture liberated in the first expansion stage is compressed and recycled into the raw gas.

The intermediate expansion of the liquid $CO_2$ fraction is conducted in a plant section wherein the first phase separator for liquid $CO_2$ is connected to a further phase separator via an expansion valve, the head of the last-mentioned phase separator being connected, via a compressor, with the raw gas line, and the sump of this phase separator being connected with the expansion valves connected in front of the heat exchanging surfaces for evaporating $CO_2$.

The plant section for the intermediate expansion of $CO_2$-loaded, $H_2S$-free scrubbing liquid withdrawn from the low temperature scrubbing stage comprises an intermediate expansion valve inserted in the conduit for the scrubbing liquid leading from the first into the second scrubbing column, and a separator connected after this expansion valve, which separator is connected with the raw gas line via a compressor.

When the low temperature scrubbing step of the raw gas is conducted at a high pressure, for example, at about 150 atmospheres, only a relatively small amount of scrubbing medium is required for this purpose, since the required amount of scrubbing medium decreases with increasing raw gas pressure. Correspondingly, however, there is a reduction in the quantity of $CO_2$-saturated liquid which can be branched off without interfering deleteriously with the scrubbing of $H_2S$ from the raw gas, so that, for scrubbing $H_2S$ out of the vaporized liquid $CO_2$ fraction, there is insufficient scrubbing liquid available. In this case, according to a further embodiment, the $H_2S$ is scrubbed out of the vaporized liquid $CO_2$ fraction in two stages; in this connection, pure scrubbing liquid is fed to the head of the scrubbing column, and at the same point or several (up to 10) plates therebeneath, there is introduced the $H_2S$-free, $CO_2$-loaded scrubbing liquid, coming from the step comprising the low temperature scrubbing of the raw gas.

If there is alternatively selected for the low temperature scrubbing of the raw gas a pressure which is not so high, for erample, 30 to 40 atmospheres, the amount of solvent required in this process for the $CO_2$ absorption can exceed the total requirements of scrubbing liquid necessary for scrubbing $H_2S$ from the raw gas, and for scrubbing $H_2S$ from the vaporized liquid $CO_2$ fraction. In a still further embodiment, this excess amount of $H_2S$-free, $CO_2$-loaded scrubbing liquid is withdrawn, regenerated by merely expanding the same, and recycled into the middle section of the low temperature scrubbing column. The significance of this feature resides in that $H_2S$ can be completely driven out of a scrubbing liquid loaded with $H_2S$ only by warming the same, whereas a scrubbing liquid loaded with only $CO_2$ can be regenerated by expansion solely, i.e., without any energy requirements, to such an extent that it can be employed for scrubbing out the major amount of $CO_2$ in the raw gas. Thus, the amount of scrubbing medium employed in connection with $H_2S$ scrubbing processes, which scrubbing must be heated for regeneration thereof, is maintained at a minimum. The resultant saving in the energy requirements of the process is, of course, quite important.

Because of the high pressures involved during the solvent scrubbing of the raw gas, considerable amounts of the other gaseous components, particularly $H_2$ and CO, are also dissolved. Consequently, it is preferred to initially expand the $H_2S$ and $CO_2$-containing liquid to be regenerated (as obtained from the stage comprising the low temperature scrubbing of the raw gas), to an intermediate pressure above the pressure of the step comprising scrubbing $H_2S$ from the vaporized liquid $CO_2$ fraction, and to compress the gaseous mixture liberated thereby and recycle it into the raw gas. In this way, significant values of the desired components are conserved.

A further feature resides in arranging the regeneration of the scrubbing liquid so that the main quantity of the hydrogen sulfide is obtained in a form which is sufficiently concenerated for the further processing thereof, so that the $H_2S$ fraction can be supplied, for example, to a Claus plant for the production of sulfur. This is accomplished by a regeneration system comprising expanding the $CO_2$- and $H_2S$-loaded scrubbing liquid stemming from the $H_2S$ scrubbing of the high pressure gaseous mixture, as well as the scrubbing liquid discharged from the $H_2S$ scrubbing of the vaporized liquid $CO_2$ fraction to little more than atmospheric pressure, i.e., preferably about 1.2 to 3 atmospheres. These expanded streams of scrubbing liquid are then separated from escaping gaseous mixture and then further regenerated, at first by the introduction of stripping gas, with the heat of solution being recovered, and subsequently, after heat exchange with previously regenerated solvent, by heating. In the last-mentioned process stage, a $CO_2$ fraction enriched in $H_2S$ is obtained.

By a still further modification of this invention, a still higher $H_2S$ concentration can be attained in the gas escaping during the step of regeneration by heating of the combined scrubbing medium streams, with a concomitant production of a residual gas fraction which can be discharged into the atmosphere without any further post-treatment. This is accomplished by expanding into a stripping column: (1) the resultant scrubbing liquid derived from scrubbing $H_2S$ from the high pressure gaseous mixture (said liquid being loaded with $H_2S$ and $CO_2$), together with (2) the scrubbing liquid discharged from the step of scrubbing $H_2S$ from vaporized liquid $CO_2$ fraction. This combined stream of scrubbing liquids is treated with stripping gas (with the heat of solution being recovered) and subsequently regenerated by heating. The gaseous mixture rising in the stripping column is then scrubbed with $H_2S$-free scrubbing medium. As the $H_2S$-free scrubbing medium, pure solvent regenerated by heat is employed, since an extra amount of $CO_2$-saturated scrubbing liquid will not normally be available.

The plant required to conduct this just-described process is provided with a stripping column connected to the sump of the first scrubbing column and the sump of the second scrubbing column, the head of this stripping column being connected, via a conduit for pure solvent, and via heat exchangers, with the sump of a regenerating column.

Aside from methanol as the scrubbing liquid, it is possible to use other solvents having equivalent properties, for example, acetone and other ketones, dimethylformamide, and other alcohols than methanol.

Referring now to the drawings, in the process depicted in FIGURE 1, the gaseous mixture to be processed is available at a pressure of 75 atmospheres absolute and has the following composition: 62.97% $H_2$, 0.16% $N_2$, 3.40% CO, 0.23% Ar, 0.59% $CH_4$, 32.40% $CO_2$, and 0.25% $H_2S$. It is fed at a rate of 84,900 $Nm^3/h$. through conduit 1 and first flows through the countercurrent heat exchangers 2 and 3 where it is cooled by the cold separation products. The interchangeable absorbers 4 are interposed between the heat exchangers 2 and 3 in order to remove $H_2O$. In the heat exchange coil 5 located in a bath of liquid $CO_2$ evaporating below 16 atmospheres absolute, the raw gas is subjected to a further lowering of its temperature. Then, it is cooled in the cooler 6 by indirect heat exchange with evaporating ammonia and then in the cooler 7 with evaporating $CO_2$ to such an extent that part of the $CO_2$ in said gaseous mixture is liquefied. The resultant liquid-vapor mixture is passed into separator 8, where the condensed $CO_2$ is collected. The residual raw gaseous mixture is then passed through cooler 9 and, finally, it is introduced into the bottom portion of the two-stage low temperature scrubbing column 11 operating at 75 atmospheres absolute. Pure methanol, serving as the scrubbing liquid, is introduced at the head of this column through conduit 12. In the upper scrubbing stage, this methanol absorbs the $CO_2$ contained in the gas. In order to remove the heat of solution developed during this step, part of the scrubbing liquid is withdrawn, conducted through the coolers 13, 14, and 15, and recycling to the scrubbing column 11. In the lower scrubbing stage, the hydrogen sulfide is removed from the gas with the aid of a smaller amount of scrubbing medium.

The purified gas exiting from column 11 at 16 in an amount of 57,000 $Nm^3/h$. is free from $H_2S$ and has the following composition: 93.61% $H_2$, 0.23% $N_2$, 5.00% CO, 0.33% Ar, 0.83% $CH_4$, and 20 p.p.m. $CO_2$. The purified gas is passed into the adsorber 17 containing silica gel wherein the entrained methanol vapors are removed. The methanol-free gaseous mixture is then passed to the system 18 wherein it is washed with liquid nitrogen and also adjusted to the hydrogen-nitrogen ratio required for the ammonia synthesis. The synthesis gas is withdrawn from the nitrogen scrubbing device 18 through conduit 19. A partial stream, about 30 to 50% passes through conduit 20 into the heat exchangers 21 and 22 which are connected in parallel with respect to the synthesis gas. From these heat exchangers, this partial stream is recycled into conduit 19 via conduit 23. The total synthesis gas is then employed in the heat exchanger 15 for cooling the scrubbing liquid from the column 11 and subsequently in the heat exchanger 24 for super cooling liquid $CO_2$. Finally, the synthesis gas is withdrawn from the plant via the heat exchangers 3 and 2.

Scrubbing liquid from the $CO_2$ scrubbing stage and which is in excess over that required in the $H_2S$ scrubbing stage is withdrawn through conduit 25, somewhat cooled in the cooler 9 by the raw gas to be scrubbed, and expanded in valve 26 to 16 atm. abs. During this expansion, a gas is separated containing in addition to $CO_2$, mainly hydrogen and CO, as well as $CH_4$, Ar, and $N_2$, said gas being recycled through conduit 27 via the compressor 28 into the raw gas conduit 1. The scrubbing liquid which is now under a pressure of 16 atm. abs. is withdrawn from the separator 29 through conduit 25, expanded in valve 30 to 6 atm. abs., and then introduced to the head of column 31.

The liquid $CO_2$ collected in the separator 8 is fed through conduit 32 to the expansion valve 33, expanded to 16 atm. abs., and introduced into the column 34. The sump of this column is heated by the raw gas flowing through the coil 5. In the sump of column 34, besides the evolution of a small amount of $H_2S$, the other raw gas components dissolved in the liquid $CO_2$ are also driven off. Owing to cool coil 35, however, $CO_2$ and $H_2S$ are again partially condensed from the rising gaseous mixture. The non-condensed, residual gas is passed via conduit 36 into recycle stream in conduit 27.

In the sump of column 34, liquid $CO_2$ are collected which is contaminated only by $H_2S$. This liquid $CO_2$ is withdrawn through conduit 37 and super cooled in the coolers 38 and 24. A part thereof, about 1 to 5% is expanded through valve 39 into the coil 35, where it is vaporized at 6 atm. abs., thereby cooling the gaseous mixture discharged from column 34. A further portion of the liquid $CO_2$ about 30 to 50% is likewise expanded in the valve 40 to 6 atm. abs. and evaporates in the heat exchanger 14, thereby cooling the scrubbing medium previously warmed by the exothermic heat of solution in column 11. The residual portion of the liquid $CO_2$ is expanded in valve 41 to 6 atm. abs. and then passed into heat exchanger 7, wherein this $CO_2$ portion is vaporized in indirect heat exchange contact with condensing $CO_2$ in the raw gas.

The various liquid $CO_2$ fractions now in the vapor phase are collected at 42, after having been employed at different points in the process system as refrigerating medium. They are then heated in the heat exchanger 38 and fed into the scrubbing column via conduit 43. At this point, the hydrogen sulfide is scrubbed out of the $CO_2$ by means of the $CO_2$-saturated scrubbing liquid which was expanded in valve 30, so that there can be withdrawn through conduit 44 16,401 $Nm^3/h$. of $CO_2$ having a content of 0.66% $H_2$, 0.01% $N_2$, 0.16% CO, 0.02% Ar, 0.12% $CH_4$ and 20 p.p.m. $H_2S$.

The regeneration of the scrubbing liquids loaded with $H_2S$ and $CO_2$, as withdrawn from columns 11 and 31, is conducted as follows: The sump liquid of colunm 11 is expanded in valve 45 to 16 atm. abs. The gas liberated thereby is separated from the liquid in the phase separator 46 and introduced into the recycle gas conduit 27 through conduit 47. The liquid is now further expanded in valve 48 to 1.3 atm. abs. and the sump liquid of column 31 is expanded in the valve 49 to the same pressure, both expanded streams being fed into the phase separator 50. From this phase separator through conduit 51, there are withdrawn 6,500 $Nm^3/h$. of impure $CO_2$ having the following composition of normally gaseous components: 98.55% $CO_2$, 0.80% $H_2S$, 0.38% $H_2$, 0.02% $N_2$, 0.12% CO, 0.02% Ar, and 0.11% $CH_4$. This impure $CO_2$ fraction which also contains solvent vapors is then brought into heat exchange with cold synthesis gas in the cooler 21, the condensing solvent vapors being withdrawn at 52. Via conduit 53 and the heat exchangers 3 and 2, the impure $CO_2$ is finally discharged from the plant.

The combined scrubbing liquid streams partially regenerated by expansion are then introduced to the stripping column 54. The stripping gas for use in column 54 is that gas fraction withdrawn via conduit 55 from the nitrogen scrubbing plane 18 and which stems from the vaporization of the sump liquid from the nitrogen scrubbing column. The residual leaving the stripping column 54 through conduit 56 at a rate of 9,136 $Nm^3/h$. has the following composition: 40.93% $CO_2$, 0.6% $H_2S$, 5.32% $H_2$, 14.72% $N_2$, 31.20% CO, 2.06% Ar, and 5.17% $CH_4$.

The sump liquid from the column 54 is warmed in the heat exchanger 57, and is further degasified therein. In the phase separator 58, gas and liquid are again separated, the gaseous fraction being withdrawn through conduit 59. After a further heating step in the heat exchanger 60, the liquid is fed into the steam-heated regenerating column 61 operating at 1.3 atm. abs. and provided with a water-cooled condenser at its head. In this column 61, the dissolved components are completely eliminated as overhead. This overhead stream combined with the waste gas from conduit 59 represents a fraction consisting of 91.1% $CO_2$ and 8.9% $H_2S$ and is fed, at a rate of 1,207 $Nm^3/h$. via conduit 62 successively to the heat exchangers 63 and 22 and is cooled therein countercurrently by the cooled $H_2S$-enriched fraction by recycle gas in 63 and by cold synthesis gas in 22, so that any entrained methanol is condensed. This methanol is withdrawn at 64. At 65, the $H_2S$-enriched fraction leaves the plant. The methanol, which is now completely devoid of $CO_2$ and $H_2S$ is withdrawn from the regenerating column 61 at 66, cooled in heat exchangers 60 and 57, and introduced to the scrubbing column 11 via conduit 12.

Figure 2:
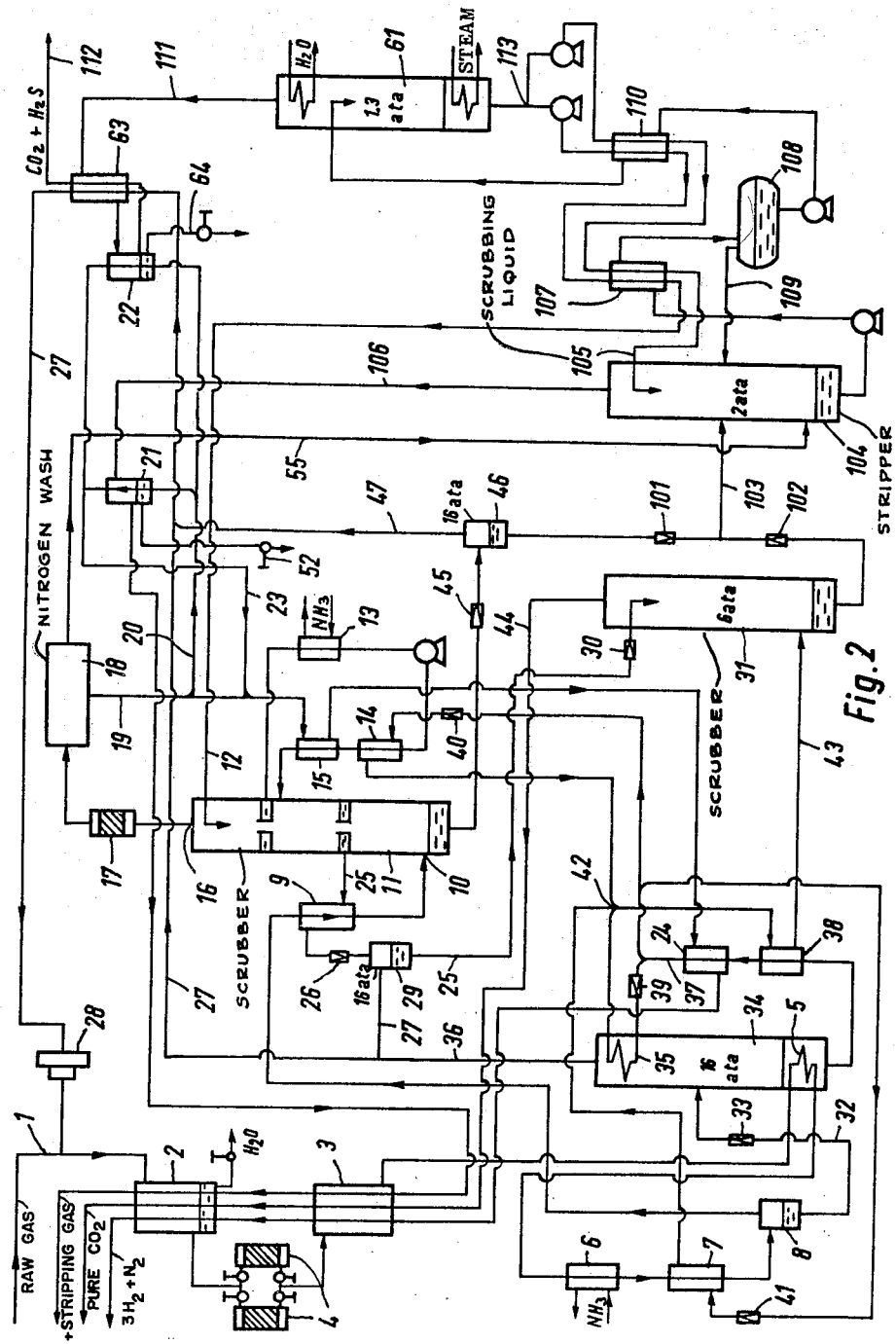
FIGURE 2 is a schematic flowsheet illustrating a modification of the embodiment depicted in FIGURE 1.

The process of FIGURE 2 differs from the process of FIGURE 1 only by the type of regeneration of the scrubbing liquids. The parts of the plant required for the purification of the gaseous mixture, which is under a high pressure, and of the liquid $CO_2$ fraction after the vaporization thereof are identical in FIGURES 2 and 1 and are thus designated by the same reference numerals.

According to FIGURE 2, the liquid streams discharged from the separator 46 and from the scrubbing column 31 are expanded in valves 101 and 102, respectively, to 2 atm. abs. and introduced together into the stripping column 104 through conduit 103. The stripping gas is reevaporated sump liquid from the nitrogen scrubbing column of the device 18, fed via conduit 55. From the gaseous mixture rising in the stripping column 104, the hydrogen sulfide is scrubbed out by means of pure methanol, the latter being introduced into the head of the column via conduit 105. A fraction amounting to 15,530 Nm³/h. and consisting of 65.41% $CO_2$, maximally 100 p.p.m. $H_2S$, and 3.30% $H_2$, 8.67% $N_2$, 18.30% CO, 1.22% Ar, as well as 3.09% $CH_4$, is withdrawn through conduit 106, which fraction can be discharged into the atmosphere.

The sump liquid from the stripping column 104 is then heated in the heat exchanger 107 and thereby further degasified. The resultant fluid is passed to the separator 108, and the gaseous fraction separated therein is fed through conduit 109 into the stripping column 104. The liquid from separator 108 is introduced through the heat exchanger 110 into the regenerating column 61 operating at 1.3 atm. abs., and there completely freed from the dissolved components. After the $CO_2/H_2S$ mixture liberated thereby has traversed the water-cooled condenser at the head of the regenerating column 61 and the coolers 63 and 22, it can be withdrawn at 112, having a composition of 83.8% $CO_2$ and 16.2% $H_2S$, at a rate of 1,313 Nm³/h., and can be fed to a Claus plant. The regenerated methanol is divided at 113 into two streams which are first both cooled in the heat exchangers 110 and 107, and then one partial stream is introduced into column 11 via conduit 12 and the other partial stream is fed to column 104 via conduit 105. Where insufficient scrubbing liquid is available for scrubbing $H_2S$ out of the vaporized liquid $CO_2$ fraction in instances where the low temperature scrubbing step of the raw gas is conducted at high pressures on the order of about 150 atmospheres, as referred to above, the $H_2S$ can be scrubbed out of the vaporizing liquid $CO_2$ fraction in two stages in column 11. An arrangement for such two stage scrubbing is shown in FIGURE 3, wherein a portion of the excess scrubbing liquid drawn from the column 11 through the separator 29 and conduit 25 is branched off in a conduit 115, expanded through an expansion valve 116 and fed into a separator 117. Pure $CO_2$ from the separator 117 is withdrawn through a conduit 118 and, through a pump 120, re-fed into the column 11 several plates (up to 10) below the feed point for conduit 12. Impure $CO_2$ is taken from the top of the separator 117 through a conduit 121 from which it is exhausted through the conduit 53. The pure $CO_2$ from the separator 117, therefore, constitutes a portion of the scrubbing liquid, regenerated solely by expansion, and fed back to the scrubbing column 11 to form a second scrubbing stage for high pressure scrubbing.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the separation of $CO_2$ and $H_2S$ from a high pressure gaseous mixture, which process comprises condensing out part of the $CO_2$ in the liquid phase by heat exchange with separation products and by heat exchange with $CO_2$ evaporating under reduced pressure after its liquefaction, and scrubbing resultant uncondensed gaseous mixture at a low temperature, the improvement comprising withdrawing $CO_2$-loaded, $H_2S$-free scrubbing liquid from the low temperature scrubbing stage at a point where the rising gaseous mixture contains substantially no hydrogen sulfide, and employing essentially the latter scrubbing liquid to scrub $H_2S$ and $CO_2$ from vaporized liquid $CO_2$ fraction, said fraction being derived from said $CO_2$ evaporating under reduced pressure after its liquefaction.

2. A process according to claim 1 wherein hydrogen sulfide is scrubbed out of the liquid $CO_2$ fraction after the vaporization thereof at a pressure of not more than 10 atmospheres above the triple point pressure of $CO_2$.

3. A process according to claim 1 wherein the liquid $CO_2$ condensed out of the high pressure gaseous mixture is expanded in two stages to the pressure at which it is scrubbed after vaporization thereof, the gaseous mixture liberated during the first expansion stage being compressed and recycled into the raw gas.

4. A process according to claim 1 wherein the $H_2S$-free, $CO_2$-loaded scrubbing liquid withdrawn from the low temperature scrubbing stage is expanded in two stages to the pressure at which it is used for scrubbing the liquid $CO_2$ fraction after the vaporization thereof, the gaseous mixture liberated in the first stage being compressed and recycled into the raw gas.

5. A process according to claim 1 wherein hydrogen sulfide is scrubbed out of the vaporized liquid $CO_2$ fraction in a scrubbing column by introducing pure scrubbing liquid at the head of the scrubbing column, and $H_2S$-free, $CO_2$-loaded scrubbing liquid several plates therebeneath.

6. A process according to claim 1 wherein a further portion of $H_2S$-free, $CO_2$-loaded scrubbing liquid is withdrawn from the low temperature scrubbing stage, is regenerated solely by expansion, and is reintroduced into the low temperature scrubbing stage several plates below a feed point for pure scrubbing medium.

7. A process according to claim 1 wherein scrubbing liquid loaded with $H_2S$ and $CO_2$ recovered as bottoms from the low temperature scrubbing stage for the high pressure gaseous mixture is expanded to a pressure above the pressure employed for scrubbing $H_2S$ from vaporized liquid $CO_2$, and the gaseous mixture liberated therefrom is compressed and recycled into the raw gas.

8. A process according to claim 1 wherein scrubbing liquid loaded with $H_2S$ and $CO_2$ recovered as bottoms from the low temperature scrubbing of the high pressure gaseous mixture, and scrubbing liquid discharged from the step of scrubbing $H_2S$ from the vaporized liquid $CO_2$, are expanded to not more than 4 atmospheres above atmospheric pressure and are regenerated together, after separating the gaseous mixture liberated during the expansion step, said regenerating comprising withdrawing stripping gas to recover the heat of solution, and heating resultant scrubbing liquids with previously heated regenerated solvent.

9. A process according to claim 1 wherein scrubbing liquid loaded with $H_2S$ and $CO_2$ recovered as bottoms from the low temperature scrubbing of the high pressure gaseous mixture, and the scrubbing liquid discharged from the step of scrubbing $H_2S$ from liquid $CO_2$ fraction after the vaporization thereof, are expanded together in a stripping column, are treated therein with stripping gas, the heat of solution being recovered, and are subsequently regenerated by heating; and the gaseous mixture rising in the stripping column is scrubbed with $H_2S$-free scrubbing liquid.

10. An apparatus for removing $CO_2$ from a gas comprising a raw gas inlet (1), a plurality of heat exchangers having first and second flow paths (2, 3, 6, 7, 14, 35), a phase separator (8) communicative with said inlet (1) through the first flow paths of a portion of said heat exchangers (2, 3, 6, 7) for cooling and separating liquid $CO_2$ from a high pressure gaseous mixture, a first scrubbing column (11), means communicating the head of said phase separator (8) with the sump of said first scrubbing column (11), an additional scrubbing column (31), means connecting the sump of said additional column (31) with the second flow path of a portion of said heat exchangers (7, 14, 35), means including expansion valves (39, 40, 41) communicating said second flow path of said last-mentioned portion of said heat exchangers (7, 14, 35) with said phase separator (8) and means including a scrubbing medium conduit (25) communicative with the midportion of said first scrubbing column (11) providing communication between the head of said additional scrubbing column (31) and said first scrubbing column (11).

11. An apparatus according to claim 10 wherein said means communicating said second flow paths of said last-mentioned portion of said heat exchangers (35, 14, 7) with said phase separator (8) includes a further phase separator (34), the sump of said phase separator (8) communicating with an intermediate portion of said further phase separator (34), the sump of said further phase separator (34) communicating with said second flow path of said last-mentioned portion of said heat exchangers (35, 14, 7), and means including a compressor (28) communicating the head of said further phase separator (34) with said raw gas inlet (1).

12. An apparatus according to claim 10 further comprising an intermediate expansion valve (26) and a second phase separator (29) positioned in said scrubbing medium conduit (25) and means including a compressor (28) communicating the vapor side of said second phase separator (29) with said raw gas line (1) for recycling of vapor thereto.

13. Apparatus according to claim 10, further comprising a stripping column (104) in communication with the sump of the first scrubbing column (11) and the sump of the second scrubbing column (31), a regenerating column (61) for regeneration of solvent and means including a conduit (105), heat exchangers (107 and (110), communicating the sump of said regenerating column (61) with the head of said stripping column (104).

References Cited

UNITED STATES PATENTS

| 2,863,527 | 12/1958 | Herbert et al. | |
| 2,880,591 | 4/1959 | Kwank | 62—17 |
| 3,130,026 | 4/1964 | Becker | 62—17 |

FOREIGN PATENTS

| 713,414 | 8/1954 | Great Britain. |
| 908,013 | 7/1949 | Germany. |

WILBUR L. BAJCOMB, JR., Primary Examiner

U.S. Cl. X.R.

23—150, 181; 55—68, 73; 62—20, 23, 24, 27, 28